Patented Sept. 19, 1933

1,927,185

UNITED STATES PATENT OFFICE 1,927,185

RESISTOR UNIT AND METHOD OF MAKING THE SAME

Laurence E. Power and Lynde Bradley, Milwaukee, Wis., assignors, by direct and mesne assignments, to Allen-Bradley Company, Milwaukee, Wis., a corporation of Wisconsin No Drawing. Application March 28, 1930
Serial No. 439,846

10 Claims. (Cl. 201—75)

This invention relates to certain new and useful improvements in electrical resistors and refers more particularly to molded fixed resistors and the method of making the same.

Heretofore, fixed resistor units have been molded of two general types of compound, one comprising a mixture of phenol resin, asbestos fiber, and graphite, and the other a mixture of phenol resin, asbestos fiber, and carbon black.

Each type of compound had certain advantages and disadvantages. The compound including graphite had a desirably low positive temperature co-efficient of resistance, but units made of this mixture were noisy in radio apparatus and also had marked voltage characteristics particularly in the higher resistance values. For these reasons graphite was used only in making units of the lower resistance values up to 50,000 ohms.

The carbon black mixtures on the other hand were far better as to voltage characteristics and quiet operation but could be used successfully only for making units from 50,000 ohms upward, because of the difficulty of calibation as compared with the ease with which graphite compound units were calibrated by a method known in the art as "sparking" which consists in passing high frequency oscillatory current through the units.

Units made of carbon black also had an appreciable drop in resistance under heavier loads resulting from the inherent high negative temperature co-efficient of carbon black molding mixtures. The relatively high negative temperature co-efficient of resistance of carbon black was its principal objection and the fact that the co-efficient was negative accentuated the objection as it tended to cause the load carried by the units to accumulate to a point where they would be destroyed.

It is, therefore, an object of this invention to provide a molded resistor unit and a method of making the same wherein the advantages of both compounds can be maintained without their attendant disadvantages.

Another object of this invention resides in the provision of a method of forming molded resistor units which have a low positive temperature co-efficient of resistance without involving undesirable voltage characteristics and noisy performance when the unit is used in connection with radio apparatus.

With the above and other objects in view which will appear as the description proceeds, our invention resides in the novel construction, combination and arrangement of parts substantially as hereinafter described and more particularly defined by the appended claims, it being understood that such changes in the precise embodiment of the hereindisclosed invention may be made as come within the scope of the claims.

From test and experiment it has been found that the reason resistor units formed from graphite compounds had a low positive temperature co-efficient of resistance, and units having carbon black as an ingredient had a negative co-efficient, was the fact that graphite had a lower temperature co-efficient of expansion than carbon black. Tests also showed that superiority of carbon black over graphite with respect to voltage characteristics and quietness of operation is due to the extremely fine state of subdivision of the former.

From this it is obvious that a conductor fine enough to give the desired low voltage characteristics and quiet operation and having a temperature co-efficient corresponding to that of graphite would produce resistor units of considerably better quality than existing methods. The present invention obtains these factors by heating carbon black to graphitizing temperatures in an electric furnaces or the like.

The heating or calcining at extremely high temperatures decreases the expansion co-efficient of the carbon black to that of graphite even though carbon black cannot be changed into graphite by any amount of heat as far as is known.

Resistor units molded of compounds in which calcined carbon black is used as the conductor are quiet in operation, have the desired low voltage characteristics and the low temperature co-efficient of resistance. The specific formula or proportions of ingredients depends of course upon the desired resistance of the unit. Two respective formulas are as follows:

For 20 meg. units:—Electric calcined carbon black 6% to 11%, resin 53% to 55%, stearic acid 4%, asbestos fluff, balance.

For 50,000 ohm units:—Electric calcined carbon black 10% to 16%, resin 54% to 57%, stearic acid 4%, asbestos fluff, balance.

The above materials are ground up and thoroughly mixed in a ball mill. The mixture is then run through rubber mixing rolls and a temperature between 80 degrees centigrade and 110 degrees centigrade is maintained in the mixture. While in the present embodiment, process has been given as heating the carbon black to graphitizing temperatures, it is apparent that temperatures lower than graphitizing temperatures may be used.

From the foregoing description it will be readily apparent to those skilled in the art to which an invention of the character described appertains, that I provide a novel method of making fixed resistor units wherein a single type of compound is readily adaptable for molding units of both high and low resistivity.

What we claim as our invention is:

1. The method of making electrical resistors which comprises calcining carbon black to substantially graphitizing temperature, mixing the calcined carbon black with resin, and asbestos fiber, and in molding the compound to a desired shape.

2. A molded fixed electrical resistor comprising phenol resin approximately 53% to 57%, carbon black calcined to substantially graphitizing temperature, approximately 6% to 16%, stearic acid, approximately 4%, and asbestos fiber for the balance.

3. The method of making electrical resistors which comprises calcining carbon black to substantially graphitizing temperature, mixing the calcined carbon black with resin, and asbestos fiber with the aid of heat, and in molding the compound to a desired shape.

4. In an electrical resistor, an electrical conducting material comprising carbon black calcined at substantially graphitizing temperatures.

5. The method of making electrical resistors which comprises calcining carbon black at a temperature of approximately 1900° centigrade or thereover, mixing the calcined carbon black with a suitable binder and filler, and molding the mixture to the desired shape.

6. As an article of manufacture, a resistor unit made by the method defined in claim 5.

7. As an article of manufacture, an electrical resistor unit having as ingredients thereof, a nonconducting material serving as a filler, a suitable material affording a binder, and carbon black calcined to substantially graphitizing temperature.

8. The herein described method of making electrical resistors which have carbon black as the conductor, including as a vital step thereof, fixing the temperature coefficient of expansion of the carbon black by calcining the same to substantially graphitizing temperature.

9. The process of making a resistor which consists in calcining carbon black in its free finely divided state, mixing the calcined carbon black with inert insulating material and a binder forming a desired shape therefrom and baking to set the binder.

10. An electrical resistor consisting of an inert insulating material intimately bonded together with carbon black particles calcined in the free finely divided form.

LAURENCE E. POWER.
LYNDE BRADLEY.

DISCLAIMER 1,927,185.—*Laurence E. Power* and *Lynde Bradley*, Milwaukee, Wis. RESISTOR UNIT AND METHOD OF MAKING THE SAME. Patent dated September 19, 1933. Disclaimer filed May 25, 1939, by the assignee, *Allen-Bradley Company*.
Hereby enters this disclaimer to claims 9 and 10 in said specification.
[*Official Gazette June 20, 1939.*]

apparent to those skilled in the art to which an invention of the character described appertains, that I provide a novel method of making fixed resistor units wherein a single type of compound is readily adaptable for molding units of both high and low resistivity.

What we claim as our invention is:

1. The method of making electrical resistors which comprises calcining carbon black to substantially graphitizing temperature, mixing the calcined carbon black with resin, and asbestos fiber, and in molding the compound to a desired shape.

2. A molded fixed electrical resistor comprising phenol resin approximately 53% to 57%, carbon black calcined to substantially graphitizing temperature, approximately 6% to 16%, stearic acid, approximately 4%, and asbestos fiber for the balance.

3. The method of making electrical resistors which comprises calcining carbon black to substantially graphitizing temperature, mixing the calcined carbon black with resin, and asbestos fiber with the aid of heat, and in molding the compound to a desired shape.

4. In an electrical resistor, an electrical conducting material comprising carbon black calcined at substantially graphitizing temperatures.

5. The method of making electrical resistors which comprises calcining carbon black at a temperature of approximately 1900° centigrade or thereover, mixing the calcined carbon black with a suitable binder and filler, and molding the mixture to the desired shape.

6. As an article of manufacture, a resistor unit made by the method defined in claim 5.

7. As an article of manufacture, an electrical resistor unit having as ingredients thereof, a non-conducting material serving as a filler, a suitable material affording a binder, and carbon black calcined to substantially graphitizing temperature.

8. The herein described method of making electrical resistors which have carbon black as the conductor, including as a vital step thereof, fixing the temperature coefficient of expansion of the carbon black by calcining the same to substantially graphitizing temperature.

9. The process of making a resistor which consists in calcining carbon black in its free finely divided state, mixing the calcined carbon black with inert insulating material and a binder forming a desired shape therefrom and baking to set the binder.

10. An electrical resistor consisting of an inert insulating material intimately bonded together with carbon black particles calcined in the free finely divided form.

LAURENCE E. POWER.
LYNDE BRADLEY.

DISCLAIMER 1,927,185.—*Laurence E. Power* and *Lynde Bradley*, Milwaukee, Wis. RESISTOR UNIT AND METHOD OF MAKING THE SAME. Patent dated September 19, 1933. Disclaimer filed May 25, 1939, by the assignee, *Allen-Bradley Company*.
Hereby enters this disclaimer to claims 9 and 10 in said specification.
[*Official Gazette June 20, 1939.*]

DISCLAIMER 1,927,185.—*Laurence E. Power* and *Lynde Bradley*, Milwaukee, Wis. RESISTOR UNIT AND METHOD OF MAKING THE SAME. Patent dated September 19, 1933. Disclaimer filed May 25, 1939, by the assignee, *Allen-Bradley Company*.
Hereby enters this disclaimer to claims 9 and 10 in said specification.
[*Official Gazette June 20, 1939.*]